July 25, 1944.	C. LEVINSEN	2,354,466
VENTILATOR
Filed Dec. 2, 1942
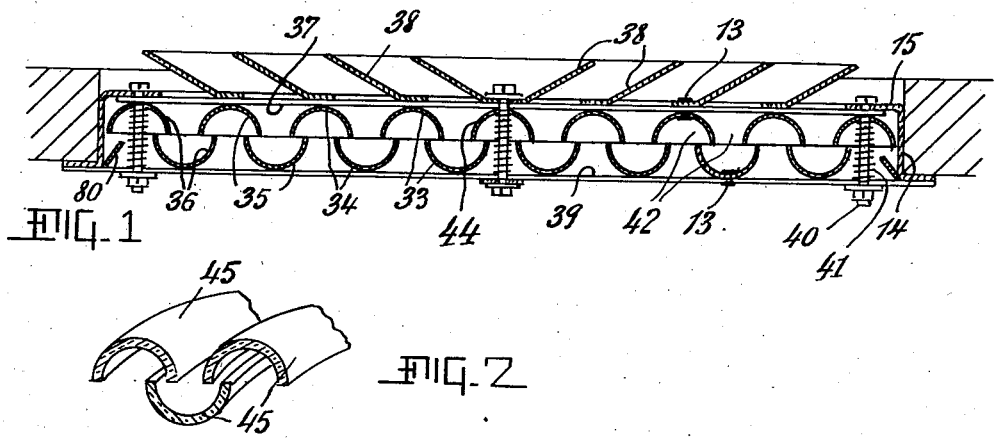
INVENTOR.
Claus Levinsen
BY
Ivan E. A. Konigsberg
Atty.

Patented July 25, 1944

2,354,466

UNITED STATES PATENT OFFICE 2,354,466

VENTILATOR

Claus Levinsen, Brooklyn, N. Y.

Application December 2, 1942, Serial No. 467,584

3 Claims. (Cl. 98—121)

This invention relates to improvements in porthole ventilators for black out purposes and other purposes.

The present invention has for its object to provide a porthole ventilator of improved construction whereby to increase the speed of manufacture, facilitate the assembly and reduce the cost. It is also an object so to construct the ventilator that some of its characteristic features may be used for the purpose of constructing a ventilator not necessarily limited for black out purposes.

The invention is therefore embodied in a porthole ventilator in which the louvers consist entirely of ring members supported in overlapping concentric relation within the ventilator frame. The ring louvers may be stamped, spun, pressed or otherwise formed for quick manufacture and assembly. Accordingly the invention is embodied in a porthole ventilator constructed as hereinafter described and as illustrated in the accompanying drawing in which Fig. 1 is a horizontal sectional view through a ventilator embodying the invention.

Fig. 2 is a detail view showing the louvers in Fig. 1 constructed for use under other than black out conditions.

The ventilator consists of layers of louver ring members of semicircular cross section. There are two layers of ring louvers each consisting of four rings 33, 34, 35 and 36 positioned in overlapping relation. The outboard layer of rings is carried by one or more cross bars 37 to which are secured windscoop vanes 38. The inboard layer of rings is carried by one or more cross bars 39 which in turn are secured to the ventilator casing 14. Bolts 40 pass through the two layers of rings and bars. The bolts carry springs 41 which engage the cross bar 37 to press the outboard layer of louvers against the flange 15 of the casing 14 and thus hold the two layers of louvers in open ventilating position to form tortuous air channels 42 through the ventilator. If however a heavy sea beats against the ventilator the outer layer will be forced inward against the force of the springs 41 to close the air channels so that water can not pass through. In this construction the vanes 38 also serve as light stopping members so that light cannot pass through the channels 42 and be reflected from the curved surfaces of the rings which otherwise might cause diffused light to shine through the ventilator. A central button member 44 overlaps the two inner rings to close the gap between them. The ventilator described above will preferably be painted a dull black to prevent reflection of light.

Fig. 4 is a detail view showing that the ring members 45 which are like the ring members in Fig. 3 and similarly mounted may be made of glass or other transparent material and thus be used for preventing the passage of water through the ventilator when the passage or prevention of the passage of light is not a factor to be considered.

I claim:

1. A porthole ventilator unit comprising a plurality of annular louvers of semi-circular cross section facing inwardly in said unit, means for maintaining said louvers in concentric spaced formation to form an outer layer of louvers, a second plurality of like louvers facing outwardly in said unit, means for maintaining the said like louvers in concentric spaced formation to form an inner layer of louvers overlapping the louvers in said outer layer, an annular casing enclosing said layers of louvers, means for securing the inner layer of louvers to said casing, said outer layer being movable within the casing and spring means interposed between said layers to automatically maintain the same in open ventilating position, said outer layer being adapted to be moved against the force of said spring means to close the louvers in the outer layer upon the louvers in the inner layer by impact of the sea against said outer layer.

2. A ventilator unit according to claim 1 including light obstructing wind catching vanes secured to the louvers in the outer layer.

3. A ventilator according to claim 1 in which said annular louvers are of transparent material.

CLAUS LEVINSEN.